(12) United States Patent
Takaura et al.

(10) Patent No.: US 8,777,421 B2
(45) Date of Patent: *Jul. 15, 2014

(54) PROJECTION OPTICAL SYSTEM

(71) Applicants: Atsushi Takaura, Tokyo (JP); Kazuhiro Fujita, Tokyo (JP); Issei Abe, Kanagawa (JP); Akihiro Yamakage, Iwate (JP); Osamu Nagase, Iwate (JP); Yoshitsugu Kohno, Iwate (JP)

(72) Inventors: Atsushi Takaura, Tokyo (JP); Kazuhiro Fujita, Tokyo (JP); Issei Abe, Kanagawa (JP); Akihiro Yamakage, Iwate (JP); Osamu Nagase, Iwate (JP); Yoshitsugu Kohno, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,310

(22) Filed: Jul. 26, 2013

(65) Prior Publication Data

US 2013/0308106 A1 Nov. 21, 2013

Related U.S. Application Data

(63) Continuation of application No. 12/670,019, filed as application No. PCT/JP2008/066145 on Sep. 2, 2008, now Pat. No. 8,529,070.

(30) Foreign Application Priority Data

Sep. 28, 2007 (JP) .................................. 2007-256283

(51) Int. Cl.
   *G03B 21/22* (2006.01)
   *G03B 21/28* (2006.01)
   *G02B 17/00* (2006.01)

(52) U.S. Cl.
   USPC .............................. 353/78; 353/99; 359/730

(58) Field of Classification Search
   USPC .......... 353/78, 98, 99, 101, 102, 37; 359/850, 359/857, 823, 726–736, 838; 348/782, 783
   See application file for complete search history.

(56) References Cited

U.S. PATENT DOCUMENTS

| 2,510,080 A | 6/1950 | Cuneo |
| 6,334,687 B1 | 1/2002 | Chino et al. |
| 7,434,938 B2 | 10/2008 | Schneider et al. |
| 7,753,531 B2 | 7/2010 | Fujita et al. |
| 2004/0027662 A1 | 2/2004 | Kurioka et al. |

(Continued)

FOREIGN PATENT DOCUMENTS

| JP | 3-73924 U | 7/1991 |
| JP | 7-239452 | 9/1995 |

(Continued)

OTHER PUBLICATIONS

Office Action issued Mar. 15, 2011, in Japan Patent Application No. 2007-256283.

(Continued)

*Primary Examiner* — William C Dowling
*Assistant Examiner* — Ryan Howard
(74) *Attorney, Agent, or Firm* — Oblon, Spivak, McClelland, Maier & Neustadt, L.L.P.

(57) ABSTRACT

A projection optical system includes first and second optical systems. The first optical system includes a transmissive-refractive element and the second optical system includes a reflective-refractive element. An image formed by a spatial light modulator is projected by the projection optical system on a projection surface. A light beam that travels along an optical path that leads from the second optical system to the projection surface in an optical path between a center of the image formed by the spatial light modulator and the projection surface is projected at an angle with respect to a normal to the projection surface. An optical axis of the first optical system is folded to a folded position by an optical path deflecting unit in an area of the first optical system where the light beam entering the optical path deflecting unit is a converging light beam or a substantially parallel light beam.

23 Claims, 11 Drawing Sheets

(56) References Cited

U.S. PATENT DOCUMENTS

| | | |
|---|---|---|
| 2004/0156117 A1 | 8/2004 | Takaura et al. |
| 2005/0157412 A1 | 7/2005 | Kurematsu et al. |
| 2006/0193036 A1 | 8/2006 | Suzuki |
| 2007/0019167 A1 | 1/2007 | Kuo |
| 2008/0192208 A1 | 8/2008 | Benoit et al. |
| 2008/0239251 A1 | 10/2008 | Destain |

FOREIGN PATENT DOCUMENTS

| | | |
|---|---|---|
| JP | 10-312024 | 11/1998 |
| JP | 2000-314920 A | 11/2000 |
| JP | 2004 347872 | 12/2004 |
| JP | 2006-145845 | 6/2006 |
| JP | 2006-235516 | 9/2006 |
| WO | WO 2005/096094 A1 | 10/2005 |
| WO | 2006 058884 | 6/2006 |

OTHER PUBLICATIONS

Office Action issued Dec. 21, 2010, in Japanese Patent Application No. 2007-256283.

Extended European Search Report issued Feb. 19, 2014 in Patent Application No. 08834014.6.

PROJECTION OPTICAL SYSTEM

CROSS REFERENCE TO RELATED APPLICATIONS

This application is a continuation application of U.S. application Ser. No. 12/670,019, filed on Jan. 21, 2010, which is the National Stage of International Application No. PCT/JP08/66145, filed Sep. 2, 2008, and which claims priority under 35 U.S.C. §119 to Japanese Application No. 2007-256283, filed Sep. 28, 2007, the entire contents of which are incorporated herein by reference.

TECHNICAL FIELD

The present invention relates to projection optical apparatuses (including projection imaging apparatuses), and particularly to oblique projection optical apparatuses.

BACKGROUND ART

Projection-type image display apparatuses are known in which an original image, such as a still image of a letter or a picture, or a moving image, is two-dimensionally formed on a small light valve and then magnified and projected by a projection optical system. The light valve, which may also be referred to as a spatial light modulator, is utilized in technologies such as transmissive liquid crystal display (LCD) panels and Digital Light Processing (DLP) and Liquid Crystal on Silicon (LCoS) technologies.

While DLP is currently the most dominant technology in the market place, the LCoS panel is increasing its share because of its superior contrast characteristics and higher optical utilization efficiency than the transmissive LCD panel, and because of its, capability to accommodate the increasing numbers of pixels in the recent years.

Projector-type image display apparatuses include the front-projection type and the rear-projection type. In the front-projection type, an image on the light valve is magnified and projected on a projection surface, such as a reflecting screen, disposed away from the device so that the reflected light can be observed. In the rear-projection type, a transmissive screen is provided within the apparatus as a projection surface, and an image on the light valve is magnified and projected onto the screen from behind it, so that the projected image can be viewed from the front of the screen.

In either type of the image display apparatus, it is desirable to reduce the size of the apparatus. Further, by reducing the distance between the device and the projection surface, it becomes possible to realize a large screen size within the minimum space.

Patent Document 1 indicated below discloses a rear-projection apparatus in which the optical path is folded twice between the light valve and the screen, whereby an original image that is longer vertically on the light valve is projected longer horizontally on the screen.

In this technology, a planar mirror is provided as a first light-deflecting unit disposed in the optical path of a projection lens system in order to deflect the optical path in a direction perpendicular to a base surface. A second light-deflecting unit is disposed in the optical path between the projection lens system and the screen surface in order to deflect the optical path in a direction parallel to the base surface.

Patent Document 2 discloses a projection optical apparatus (oblique projection optical apparatus) having a reduced projection distance. In this technology, an intermediate image of an original image on the light valve is generated by a transmissive-refractive system. The intermediate image is refocused by a concave mirror onto the screen.

Patent Document 3 discloses that the optical path of a light flux emerging from a group of lenses is deflected by a mirror in order to fold the optical axis.

Specifically, the light rays for an image on a panel (spatial light' modulator) are bent by a mirror after passing through an optical system and are further bent by another mirror before they reach a concave mirror, by which the light rays are bent and additionally bent by another mirror before the image is projected on a projection surface.

Patent Document 1: Japanese Laid-Open Patent Application No. 2004-347872
Patent Document 2: Japanese Laid-Open Patent Application No. 2006-235516
Patent Document 3: WO2006-058884

In the technology of Patent Document 1, the projection lens system extends vertically with respect to the base plate surface due to the first light-deflecting unit. Furthermore, there is the second light-deflecting unit disposed in the optical path between the projection lens system and the screen surface.

In this structure, because the height from the base surface is large, the apparatus would have an increased height if adapted for front-projection purposes.

In the optical system according to Patent Document 2, the thickness of the apparatus as a whole in the up-down direction, when adapted for a front-projection configuration, is obviously dependent on the size (height) of the largest concave mirror. In addition, because the transmissive-refractive optical system as a whole is disposed above the concave mirror, the height of the apparatus is increased all the more.

This problem is neither so conspicuous nor serious when the optical system is used for a rear-projection application and contained in the casing of a rear-projection apparatus. However, when applied in a front-projection apparatus, the size of the apparatus becomes much more noticeable.

Furthermore, the space below the transmissive-refractive optical system provides an extensive dead space extending to the lower edge of the concave mirror. Because the optical system is disposed linearly in the projection direction, the length of the apparatus in the projection direction, i.e., the depth of the apparatus, is large, thus making it difficult to realize a compact projection apparatus (because the optical system needs to be disposed further in the back of the projected image).

While in the technology of Patent Document 3, the optical axis is bent downward by a mirror, because the panel (spatial light modulator) is located below the concave mirror, the height of the set is increased.

Additionally, because the optical path is bent between the projection lens system and the concave mirror, the size of the elements required for the deflection of the optical path increases due to reasons which will be discussed below. The position of the projection light flux as it travels from the projection lens system to the concave mirror is off the optical axis of the projection lens system, which makes the setting of the elements in the optical path deflecting portion difficult.

In order to interpose the elements for folding the optical path, the distance between the projection lens system and the concave mirror needs to be increased. As seen from the drawings of Patent Document 2 illustrating the optical path, the projection light flux from the projection lens to the concave mirror has increasingly greater angles with respect to the optical axis of the lens system as the angle of view increases. As a result, the size of the concave mirror that receives such light fluxes increases as the distance from the lens system increases, so that the cost of the concave mirror also increases in a corresponding manner.

In the technology of Patent Document 3, an intermediate image is located between the projection lens system and the concave mirror, and the optical path is bent near the intermediate image, with the folding mirror disposed where the light fluxes are concentrated. As a result, the quality of the projected image is subject to even a slight error in the shape of the, folding mirror and thus tends to degrade.

An analysis by the present inventors indicates that the optical systems of the type in which an intermediate image is formed, as in Patent Documents 2 and 3, have certain characteristics in the light rays emerging from the projection lens system.

Specifically, the light ray with a large angle of view (i.e., the ray that emerges from a large height of the object) passes through a point close to the edge of a final lens, so that it is guided to the concave mirror with a large output angle.

Due to such features, the size of the final lens or a lens disposed nearby it in the projection lens system tends to increase when the optical path space is extended for the folding.

Furthermore, because the light fluxes from the lens system spread before they are incident on the concave mirror, the size of the concave mirror also tends to increase.

In Patent Documents 1 to 3, the optical path of the light ray that emerges with a large output angle from the projection lens system is bent by a folding mirror.

Such folding of the optical axis invites an increase in the size of the lenses, and prevents a decrease in the size of the apparatus.

When the folding mirror is disposed where light fluxes are focused as mentioned above, the quality of the projected image is subject to even a slight error in the shape of the folding mirror and thus tends to degrade.

Thus, in the aforementioned types of projection optical apparatuses, the decrease in size of the apparatus cannot be achieved simply by folding the optical axis with a folding mirror. It is therefore difficult to prevent a drop in image quality and reduce the size of the apparatus at the same time.

Although FIG. 9 of Patent Document 3, for example, shows a folding mirror folding the optical axis, where the spread of, the light flux is prevented by a lens, the aforementioned problem of the quality of the projected image being subject to even a slight error in the shape of the folding mirror and thus tending to degrade still remains.

DISCLOSURE OF THE INVENTION

It is therefore a general object of the present invention to provide a projection optical apparatus in which one or more of the aforementioned problems of the related art are eliminated.

In order to achieve the aforementioned objects, in accordance with an embodiment of the present invention, instead of folding the light beam that emerges from a projection lens system with a large output angle, the light beam is folded in an area closer to the spatial light modulator in the projection lens system where the light beam does not spread or is designed not to spread.

In order to prevent the spreading of the light beam, a group of lenses disposed closer to the object (i.e., the spatial light modulator) with reference to the folding space may be provided with a positive power. The greater the power, the more the light beam can be controlled to converge. Aberrations, such as axial chromatic aberration and optical face angle error, should also be balanced.

By designing the optical system so that the light beam that emerges from the group of lenses disposed closer to the spatial light modulator with reference to the folded space does not spread, the spread of the light beam (i.e., an increase in the size of the elements) in the folded space can be prevented.

Because there are no conditions concerning the concentration of light fluxes in the folded space where an intermediate image is formed, it becomes possible to control the image quality degradation due to the error in the shape of an optical path deflecting unit (such as a folding mirror) provided for the folding.

In an aspect, the invention provides a projection optical apparatus comprising a spatial light modulator; and a projection optical system including a first optical system having a transmissive-refractive element and a second optical system having a reflective-refractive element. An image formed by the spatial light modulator is projected by the projection optical system on a projection surface. A light beam that travels along an optical path that leads from the second optical system to the projection surface in an optical path between a center of the image formed by the spatial light modulator and the projection surface is projected at an angle with respect to a normal to the projection surface. When a vector in the direction of travel of the light beam is vector A, a projected component of the vector A that is substantially parallel to the projection surface is defined as an up direction, and a direction opposite to the up direction is defined as a down direction. The optical axis of the first optical system is folded by an optical path deflecting unit in a direction including a vector in an up or down direction in an area of the first optical system closer to the spatial light modulator.

In a preferred embodiment, when a direction perpendicular to the up or down direction is defined as a horizontal direction, the optical axis of the first optical system is folded in a direction including a vector in the horizontal direction in addition to the direction including the vector in the up or down direction.

In another preferred embodiment, a group of lenses disposed closer to the spatial light modulator with reference to the folded position in the first optical system has a positive composed power, wherein light fluxes emitted by the group of lenses do not spread or are substantially parallel.

In another preferred embodiment, the folded position in the first optical system is such that light fluxes emitted by a group of lenses disposed closer to the spatial light modulator with reference to the folded position do not spread or are substantially parallel.

In another preferred embodiment, the second optical system includes a reflective-refractive element having a positive power, and wherein an intermediate image is produced between the first optical system and the second optical system.

In another preferred embodiment, the reflective-refractive element having the positive power has the largest effective diameter in the projection optical system.

In another preferred embodiment, the folding in the direction including the vector in the up or down direction in the first optical system takes place toward a lower edge of the reflective-refractive element, wherein a group of lenses disposed closer to the spatial light modulator with reference to the folded position in the first optical system is disposed in a space whose lower limit is defined by the lower edge of the reflective-refractive element.

In another preferred embodiment, a group of lenses disposed closer to the spatial light modulator in the first optical system has an optical axis L1, the optical axis L1 is folded by a first optical path deflecting unit disposed on the optical axis L1 into an optical axis L2, and the optical axis L2 is folded by a second optical path deflecting unit disposed on the optical axis L2 into an optical axis L3, wherein the optical axes L1, L2, and L3 are not in the same plane in the first optical system.

In another preferred embodiment, the first optical system includes a focus adjusting mechanism provided for a group of lenses disposed closer to the second optical system in the first optical system.

In another preferred embodiment, the optical path deflecting unit includes a planar mirror.

In another preferred embodiment, the apparatus further comprises a plurality of the optical path deflecting units, wherein two of the optical path deflecting units that are disposed on a single optical axis are integrally or successively structured.

In a preferred embodiment, the optical path deflecting unit comprises a prism including two optical path deflecting units, wherein a normal to a deflecting/reflecting surface of one of the optical path deflecting units and a normal to a deflecting/reflecting surface of the other of the optical path deflecting units are perpendicular to each other.

In a preferred embodiment, a control substrate for the spatial light modulator is disposed substantially parallel to a left/right direction of the projection surface and to a plane that includes the optical axis of a group of lenses disposed closer to the second optical system in the first optical system.

In a preferred embodiment, an illumination optical system is disposed in a spatial region surrounded by the optical axes L1, L2, and L3.

In a preferred embodiment, the spatial light modulator is disposed at the same height as or above a lowest edge of the second optical system.

In a preferred embodiment, the apparatus further comprises a movable mechanism for supporting the second optical system movably relative to the first optical system, wherein the second optical system is movable toward the first optical system when no image is being projected in order to reduce a depth of the apparatus.

In a preferred embodiment, an opening portion and a light-blocking portion are provided in an optical path between the second optical system and the projection surface, wherein, during projection of an image, reflected light from the second optical system passes through the opening portion in a converging manner.

BRIEF DESCRIPTION OF THE DRAWINGS

These and other objects, features and advantages of the invention will be apparent to those skilled in the art from the following detailed description of the invention, when read in conjunction with the accompanying drawings in which.

BEST MODE OF CARRYING OUT THE INVENTION

Figure 7:
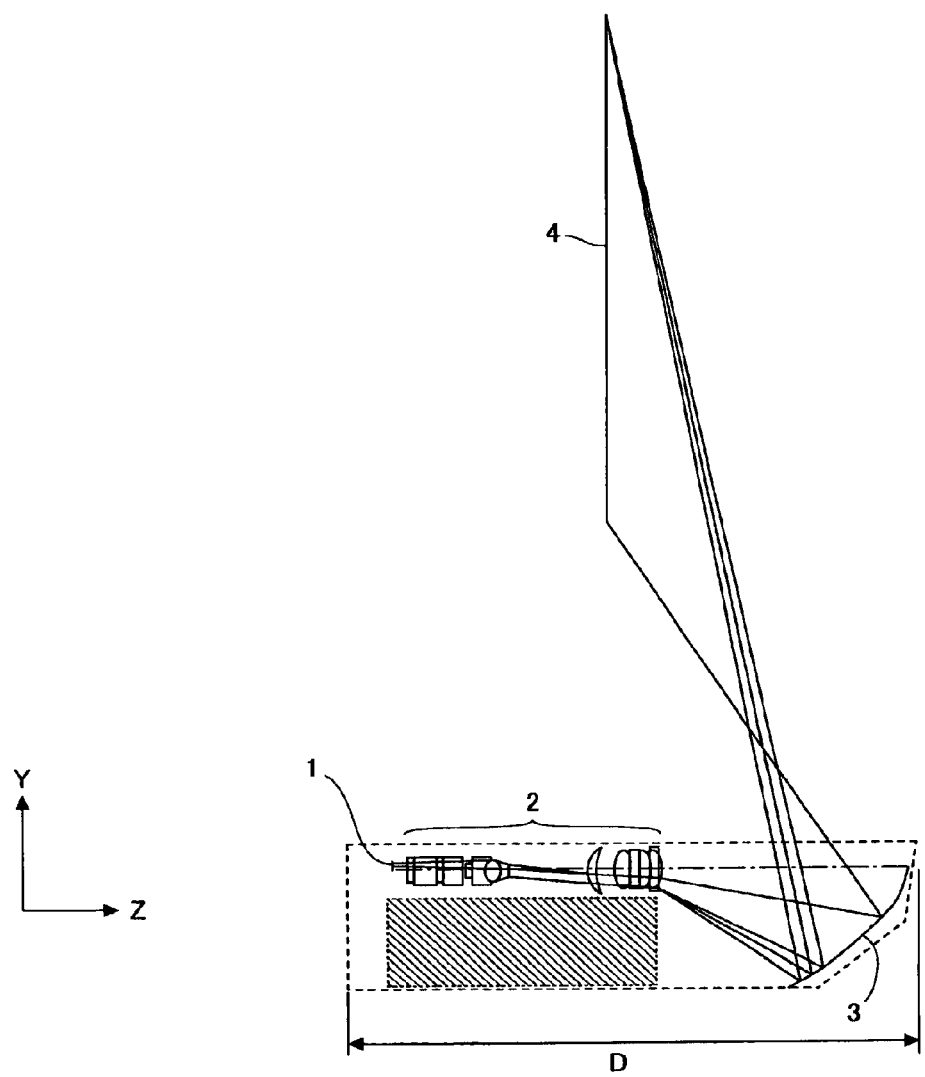
FIG. 7 shows a projection optical apparatus according to the related art.

FIG. 7 shows a side view of a front-projection apparatus according to the related art. An original image formed on a light valve 1, which is a spatial light modulator, is magnified and projected by a projection optical system consisting of a first optical system 2 and a second optical system 3 on a projection surface 4. In the example of FIG. 7, the first optical system 2 is constructed of a transmissive-refractive system. The second optical system 3 is constructed of a reflective-refractive system.

The original image on the light valve 1 is projected on the projection surface 4 as an erect image. An inverted image of the original image on the light valve 1 is produced between the first optical system 2 and the second optical system 3 as an intermediate image by the transmissive-refractive system.

The intermediate image is projected by the second optical system 3 on the projection surface 4 as an erect image.

The light valve 1 and the first optical system 2 are disposed in a straight line, so that the depth of the apparatus is D, with the area between the underside of the first optical system 2 and the lower edge of the second optical system 3 providing a dead space.

In the following, a first embodiment of the invention is described, in which parts corresponding to those described with reference to FIG. 7 are referenced by corresponding numerals.

Before describing the present embodiment, vector A is defined in order to define a Y direction in an oblique projection optical apparatus according to the present embodiment.

Figure 1:
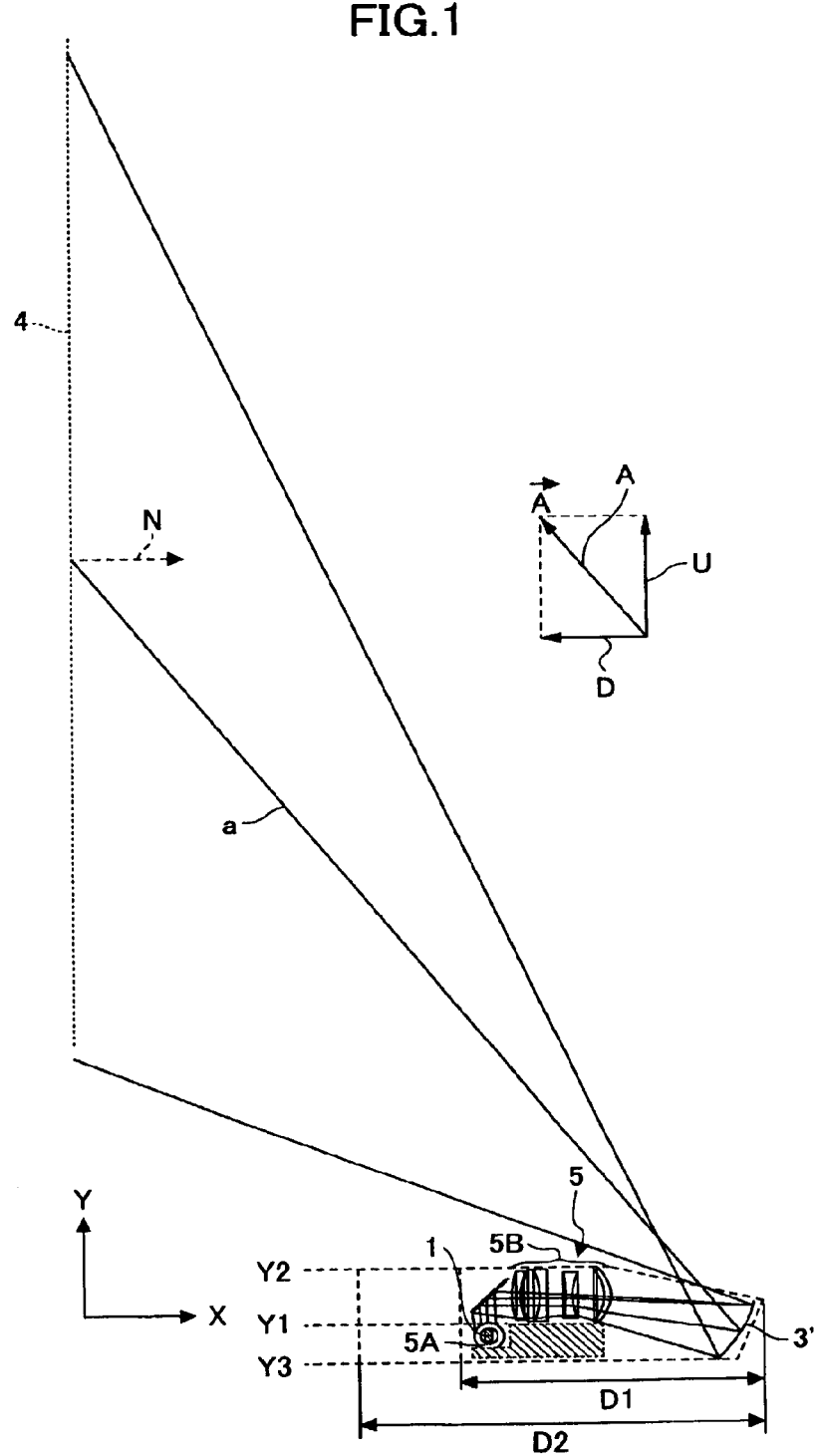
FIG. 1 shows a side view of a projection optical apparatus according to an embodiment of the invention.

FIG. 1 shows a light beam a that travels along an optical path that leads from a second optical system 3' to a projection surface 4 in an optical path between a center of an image formed on a spatial light modulator 1 and the projection surface 4. The light beam a is projected at an angle with respect to a normal N to the projection surface 4. In this case, even if there is a deflecting element along the path of the light beam a, the light beam a is assumed to pass through such a deflecting element in a straight line and reach the projection surface 4.

The vector of the light beam a in its direction of travel is defined as vector A, a projected component of vector A substantially parallel to the projection surface 4 is defined as an up direction (U), and a direction opposite to the up direction is defined as a down direction. Thus, the Y direction corresponds to an up or down direction, and the direction in which the optical path is folded includes the up or down direction.

In FIG. 1, the optical axis of the first optical system 5 is deflected by the optical path deflecting unit 6 (see FIG. 3) in the +Y direction, and is then deflected by the second optical path deflecting unit 7 (see FIG. 3) in the +X direction.

Thus, in the present embodiment, the optical path is folded in the first optical system 5, in which at least the folding in the up/down direction takes place closer to the object side (spatial light modulator side) than the folded position.

More specifically, the optical axis is folded in the −Y direction with respect to the optical axis of the first optical system with no folding shown in FIG. 7.

By adopting this structure, as shown in FIG. 1, the depth of the apparatus is reduced to D1 from the depth D2 with no folding (which corresponds to the depth D in FIG. 7).

Furthermore, because the folded portion of the optical axis can be located in the dead space under the first optical system (see FIG. 7) in the case of no folding, the dead space can be effectively utilized.

Figure 5A:
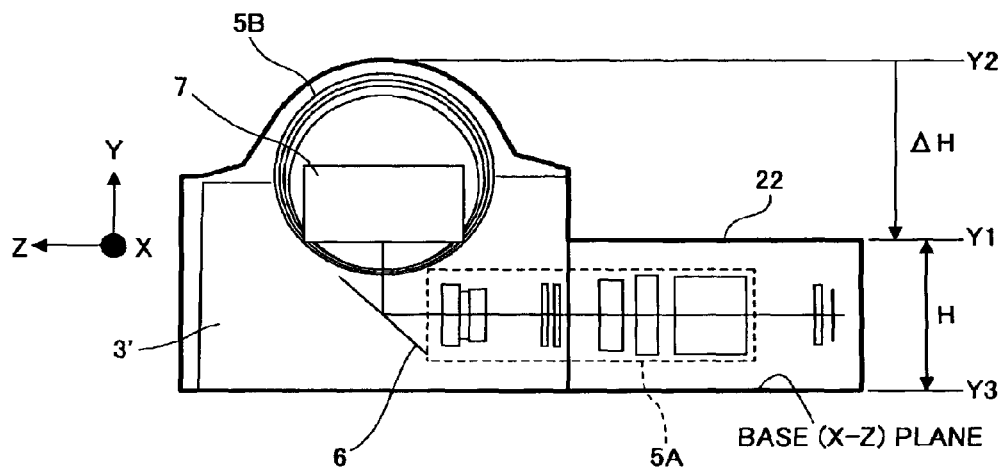
FIG. 5A shows a side view of the projection optical apparatus along a first group of lenses in the first optical system.
Figure 5B:
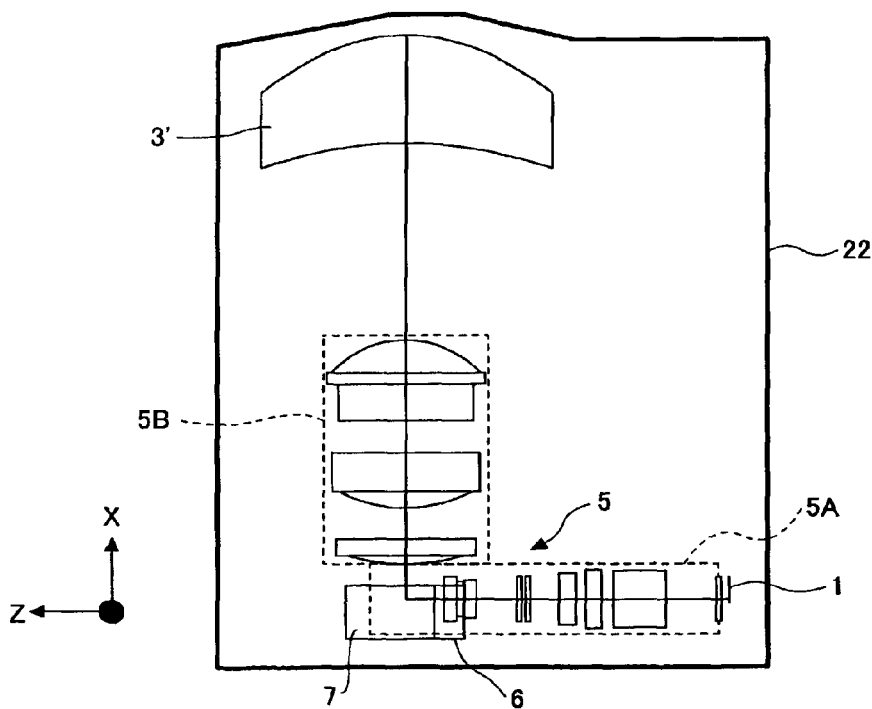
FIG. 5B shows a plan view of the first optical system and a second optical system of the projection optical apparatus.

FIG. 5A shows a Y-Z plane of the projection optical apparatus according to the present embodiment. FIG. 5B shows an X-Z plane of the projection optical apparatus. As shown in FIG. 5A, a first group 5A (closer to the light valve) of the first optical system 5 is disposed near the base surface (X-Z plane). The area of the first optical system 5 other than its second group 5B as seen in the plan view (FIG. 5B) has a height Y1 which is lower than the height of the second group 5B. Thus, the height of a major portion of the apparatus can be reduced to a height H. With reference to FIGS. 5A and 5B, numeral 22 indicates a casing of the apparatus. Also in FIGS. 5A and 5B, the optical path deflecting units 6 and 7 are shown as having rectangular shapes for the sake of easy understanding.

Thus, by folding the optical path in the up-down direction, i.e., the Y direction within the first optical system 5, the image-forming portion including the spatial light modulator 1 can be located at a lower position.

However, there may be cases where projection performance should be given priority at the expense of layout conditions. Thus, it may be impossible to design an optical system that has a sufficiently long space for allowing the folding of the optical path. In such a case, there may arise the problem that the optical path needs to be extended downward.

Specifically, simply folding the optical path downward may result in the downward length exceeding the lower edge of the second optical system 3', thus increasing the height of the apparatus.

In order to overcome this problem, in accordance with the present embodiment, at least the first optical system 5 is also folded in a horizontal direction perpendicular to the up/down direction, thus preventing the height of the apparatus extending beyond Y3 in FIG. 5A.

Thus, by folding the optical path in the horizontal direction as well as in the -Y direction within the range between Y2 and Y3, the increase in the overall height of the apparatus can be prevented.

The spatial light modulator 1 may be a light valve such as an LCD panel. In this case, because an illumination engine for illuminating the panel can be disposed in a lower portion of the apparatus (dead space), an apparatus with a more stable center of gravity can be realized.

Figure 2:
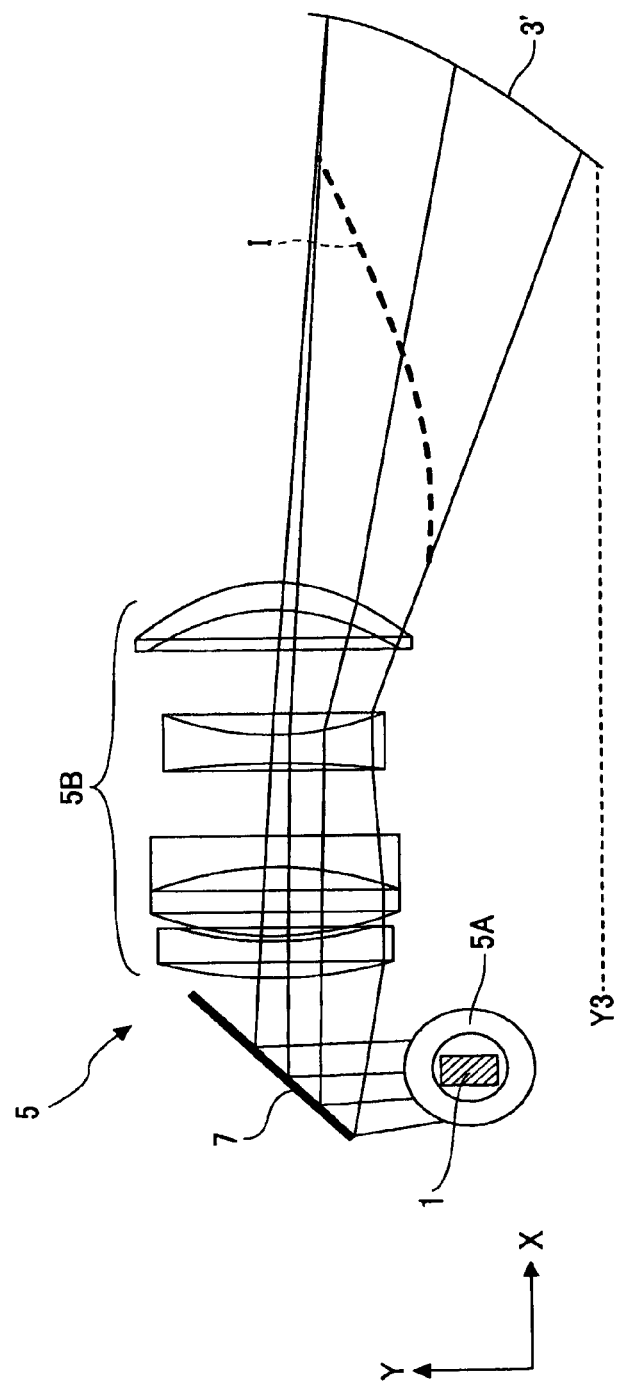
FIG. 2 shows an enlarged view of a main portion of the projection optical apparatus according to the embodiment of the invention.

Particularly in the configuration of FIG. 2, where the height of the lower edge of the second optical system 3' is indicated by Y3, by locating the spatial light modulator 1 above Y3, the dead space can be effectively utilized without increasing the height of the apparatus, thus making it possible to realize an apparatus with a smaller volume.

Figure 4:
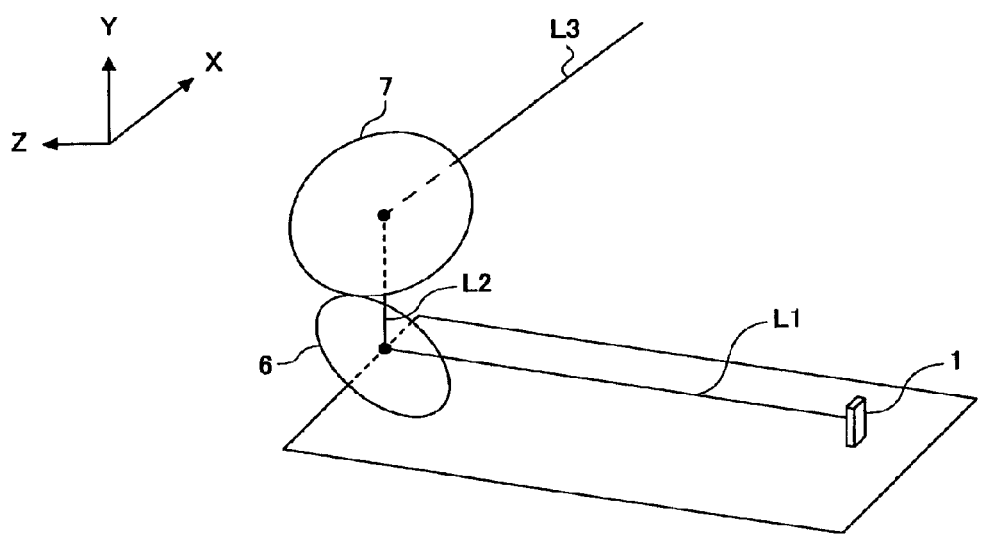
FIG. 4 schematically shows how an optical axis is folded in the embodiment of the invention.

In FIG. 2, which shows an X-Y plane, the optical path deflecting units (planar mirrors) 6 and 7 are provided in the optical path between the first group 5A and the second group 5B. The optical axis L1 (see FIG. 4) of the first group 5A is along the Z axis direction, and is deflected by the optical path deflecting unit 6 in the Y direction.

This is followed by the optical path deflecting unit 7, by which the optical axis L2 (see FIG. 4) is deflected in the X axis direction into an optical axis L3. In the optical path space between the second group 5B and the second optical system 3' (which is a reflective-refractive element having a positive power), an intermediate image plane I is formed.

The base surface of the apparatus lies in the X-Z plane. The height of the base surface in the Y direction substantially corresponds to the minimum height of the reflective-refractive element 3' in the Y direction.

Figure 3:
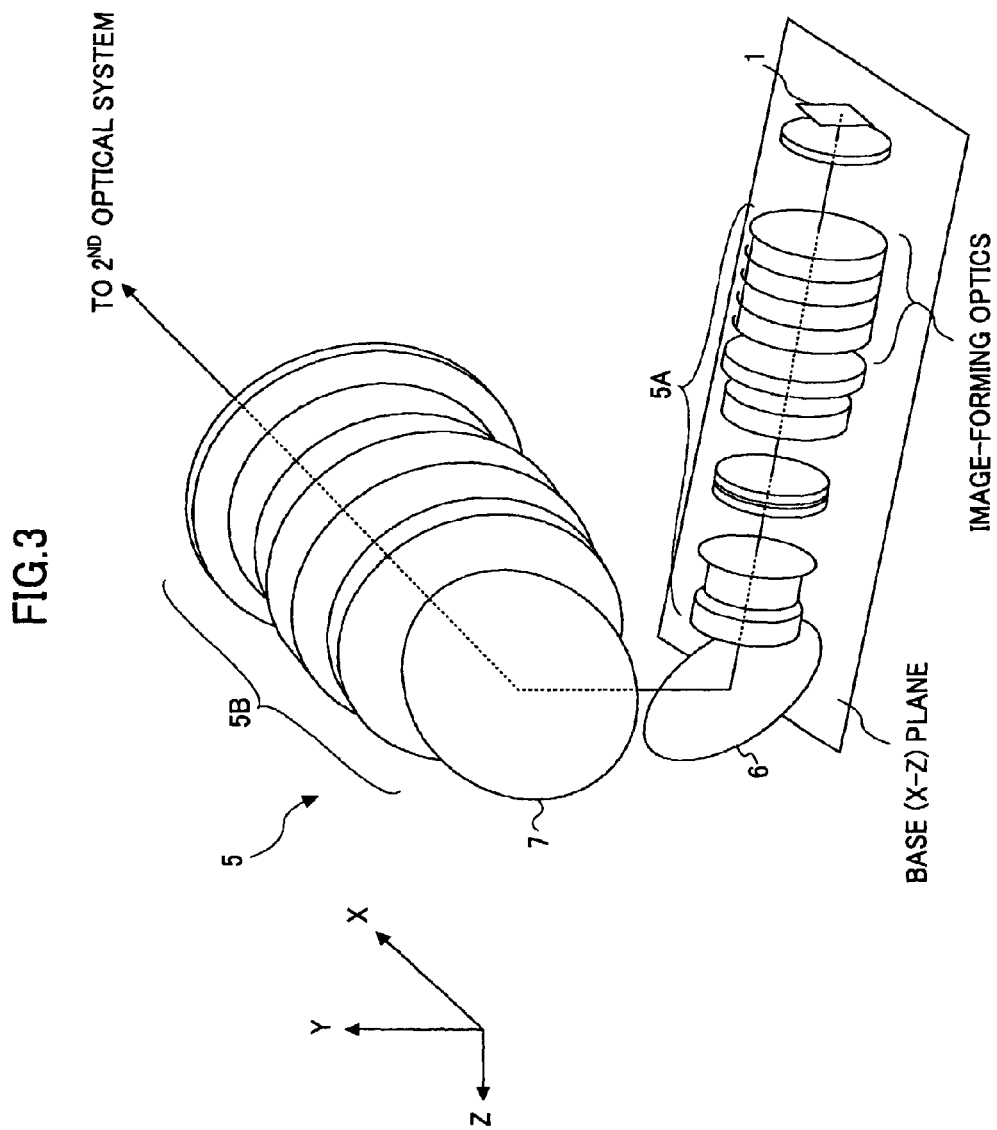
FIG. 3 shows a perspective view of a first optical system in the projection optical apparatus.

In the example shown in FIG. 3 (perspective view), the longitudinal direction of the original image on the spatial light modulator 1 is in the Y direction. The longitudinal direction of the original image on the spatial light modulator 1 is in the Y-Z plane on the deflecting surface of the optical path deflecting unit 6.

A normal to the deflecting surface of the optical path deflecting unit 6 is in the Y-Z plane, and is inclined at 45° with respect to the Z axis.

On the deflecting surface of the optical path deflecting unit 7, the longitudinal direction of the original image on the spatial light modulator 1 is in the Z axis direction. A normal to the deflecting surface of the optical path deflecting unit 7 is in the X-Y plane and inclined at −45° with respect to the X axis.

Because the optical axis is deflected in the X direction by the optical path deflecting unit 7, the projection surface is in the Y-Z plane. Thus, the longitudinal direction of the image is in the Z direction on the projection surface in the Y-Z plane, so that the projected image is longer in the lateral direction.

In the above described configuration, the following advantageous effects can be obtained.

The depth of the overall apparatus can be reduced compared with the conventional structure shown in FIG. 7.

The dead space below the first optical system 5 is reduced as shown with hatching in FIG. 1, compared with the conventional example of FIG. 7. Thus, the dead space, which is due to the second optical system 3' with a large effective diameter, can be effectively utilized and the required space of the apparatus can be reduced.

Because of the folding in the downward and horizontal directions, not only can the dead space be effectively utilized but also the length of the optical system in the horizontal direction can be reduced by the length of the portion of the optical system that is folded in the height direction. Thus, the size of the apparatus in the depth direction can be reduced.

The longitudinal direction of the spatial light modulator can be disposed in a vertical direction with respect to the base surface of the apparatus, so that an image that is longer in the direction parallel to the base surface, i.e., the lateral direction, can be projected on the projection surface. When the spatial light modulator is thus disposed in the vertical direction, the volume of a cross prism or the like can be reduced, whereby the cost for the cross prism and the weight of the apparatus can be reduced.

With reference to FIGS. 1, 2, and 3, because the optical path deflecting units 6 and 7 are successively disposed in the optical path space in the first optical system 5 between the first group 5A, which is closer to the spatial light modulator 1, and the second group 5B, which is closer to the intermediate image, the deflecting units can be readily arranged without complicating the structure or increasing the size of the apparatus.

While the optical axis L1 of the first group 5A of the first optical system 5 is shown to be parallel to the Z axis in the perspective view of FIG. 3, the optical axis L1 may be inclined with respect to the Z axis at a certain angle in the X-Z plane or in the Y-Z plane, or both.

When the optical axis is inclined in the X-Z plane, the image can be projected on the projection screen in the correct orientation by rotating the spatial light modulator 1 appropriately depending on the inclination angle.

Figure 6A:
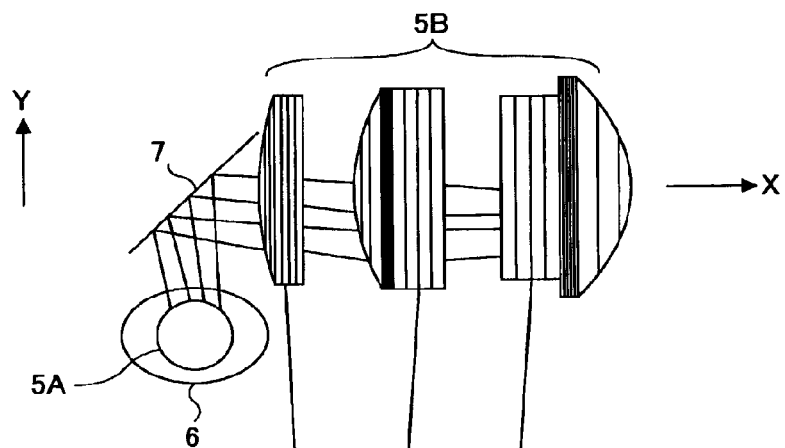
FIG. 6A shows a side view illustrating a focus adjustment process.
Figure 6B:
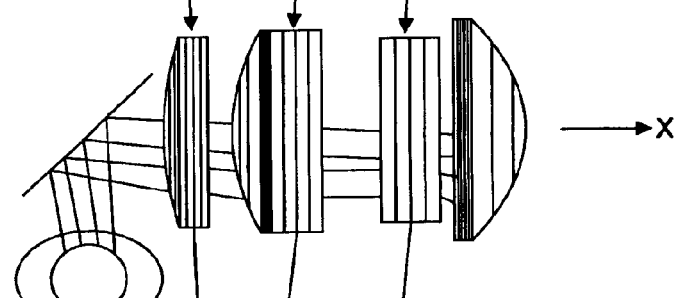
FIG. 6B shows another side view illustrating the focus adjustment process.
Figure 6C:
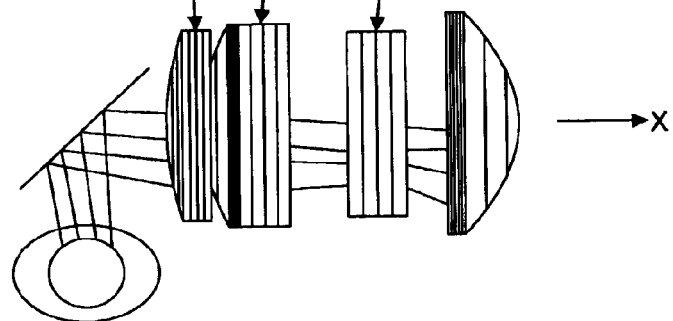
FIG. 6C shows another side view illustrating the focus adjustment process.

FIGS. 6A to 6C illustrate a focusing adjustment mechanism configured to move the optical elements of the second group 5B alone of the first optical system 5. FIG. 6A is an example of a projection screen size of 50 inches, FIG. 6B is an example of a projection screen size of 75 inches, and FIG. 6C shows an example of a projection screen size of 100 inches.

Thus, the focus adjusting mechanism is concentrated in the second group 5B, which is positioned close to the top of the apparatus with respect to the first group 5A. This means that the focus adjusting mechanism does not need to be disposed deep down from the apparatus top. Thus, a necessary unit for operating the focus adjusting mechanism does not need to be complicated in structure or increase in size. It should be readily understood that if the focus adjustment mechanism is disposed deep down, the focus adjusting mechanism would have to increase in size or become complex in order to provide its operating unit on the outside of the top surface.

In accordance with the present embodiment, the optical path deflecting units 6 and 7 are both comprised of planar mirrors, which are advantageously inexpensive. This also provides the advantage that the optical path deflecting units 6 and 7 can be readily matched with an optical system mirror frame (not shown), which is generally cylindrical.

Figure 8:
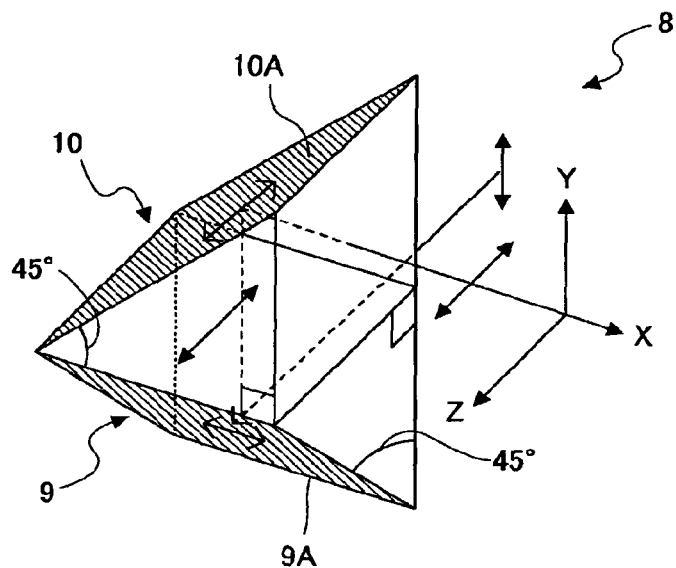
FIG. 8 shows a perspective view of an optical path deflecting unit according to another embodiment of the invention.

FIG. 8 shows a second embodiment of the present invention, in which parts or elements corresponding to those of the foregoing embodiment are indicated with corresponding numerals, and the description of their structure or function are omitted unless necessary (the same applies to the subsequent embodiments).

In the present embodiment, an optical path deflecting unit 8 including two rectangular prisms that are integrally combined is employed. Specifically, the optical path deflecting unit 8 includes a first rectangular prism 9 and a second rectangular prism 10, which correspond to the optical path deflecting units 6 and 7, respectively, of the first embodiment. A normal to the deflecting surface 9A of the first rectangular prism 9 and a normal to the deflecting surface 10A of the second rectangular prism 10 are perpendicular to each other. Thus, as mentioned above, when the longitudinal direction of the spatial light modulator 1 is disposed in a direction normal to the base surface, the longitudinal direction of the projected image becomes parallel to the base surface, as described in detail below.

With reference to FIG. 8, in the optical path leading to the first rectangular prism 9, the longitudinal direction of the spatial light modulator 1 is in the Y direction, as indicated by a double-arrow. In the optical path leading from the first rectangular prism 9 (reflecting surface) to the second rectangular prism 10, the longitudinal direction of the spatial light modulator 1 is in the Z direction.

Finally, in the optical path deflected and reflected by the second rectangular prism 10, the longitudinal direction of the spatial light modulator 1 is in the Z direction.

Thus, the longitudinal direction of the spatial light modulator 1 is converted from the Y direction to the Z direction. Because the base surface of the apparatus is in the X-Z plane as shown in FIGS. and 3, the longitudinal direction of the projected image becomes parallel to the base surface, which is assumed to be substantially horizontal to the plane on which the apparatus is disposed.

Figure 9:
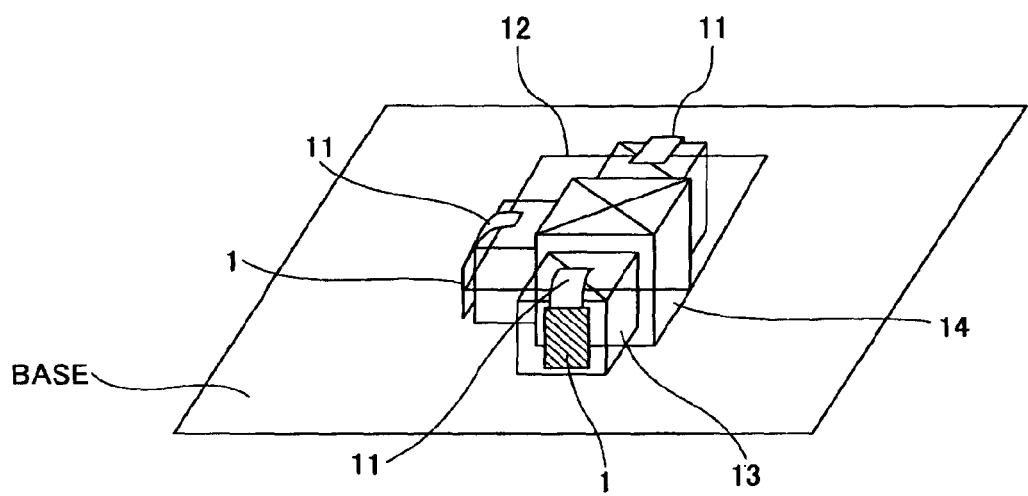
FIG. 9 shows a perspective view illustrating an arrangement of spatial light modulators and a control substrate according to another embodiment of the invention.

FIG. 9 shows a third embodiment of the invention.

In the present embodiment, cables 11 are drawn to the top surface side from spatial light modulators 1 from their shorter sides and connected to a control substrate 12. Thus, the control substrate 12 can be disposed parallel to the base surface easily.

In this arrangement, because the height of the apparatus is not constrained by the longitudinal or lateral length of the control substrate 12, the height of the apparatus can be made shorter than the longitudinal or lateral length of the control substrate 12.

While polarization beam splitters 13 are shown employed in the present embodiment, wire grid polarizers may be used instead. In FIG. 9, numeral 14 indicates a light-composing prism.

Figure 10:
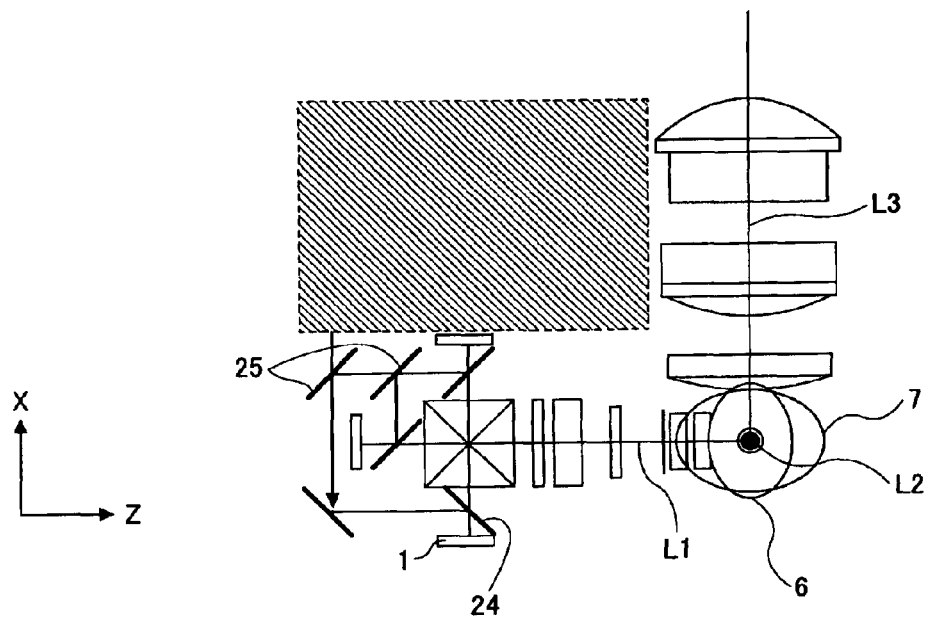
FIG. 10 shows a plan view of an arrangement of elements in another embodiment of the invention.

FIG. 10 shows a fourth embodiment of the invention.

With reference to FIG. 10, which shows an X-Z plane view, an optical axis L1 of a projection optical system prior to an optical path deflecting unit 6, i.e., closer to the spatial light modulator 1, lies in the Z direction. An optical axis L3 of the projection optical system in a subsequent stage lies in the X direction due to an optical path deflecting unit 7. Thus, in this planar view, the optical axis is folded in an L shape.

By placing an illumination optical system in an area with hatching in FIG. 10, waste of space in the apparatus as a whole can be reduced, and the apparatus can be reduced in size. In the present embodiment, a conventional illumination optical system may be employed. As long as the illumination system includes a light source, an illuminance-equalizing optical system, and a polarization conversion element, an improved efficiency of utilization of illumination light can be achieved.

The illuminance may be equalized by means of a fly-eye optical system or a rod integrator element. A condenser lens for adjusting the angle of diffusion of the illuminating light may also be used. The light source may comprise a metal halide lamp or a high-pressure mercury lamp, or it may comprise a solid-state light source such as a laser or a light-emitting diode (LED).

In the embodiment shown in FIG. 10, a wire grid polarizer with excellent polarization separation characteristics or a polarization beam splitter may be used as a. polarization separation plate 24.

While the example shown in FIG. 10 involves a so-called three-plate type in which the illuminating light is separated into the three colors of RGB by wavelength separating plates 25, and then each of the colors is shone onto an individual spatial light modulator, the invention is not limited to such an example. In another embodiment, a single spatial light modulator 1 may be employed, and an image may be generated using a color scroll filter in a field-sequential manner, and still the effects of the present invention can be obtained.

Figure 11A:
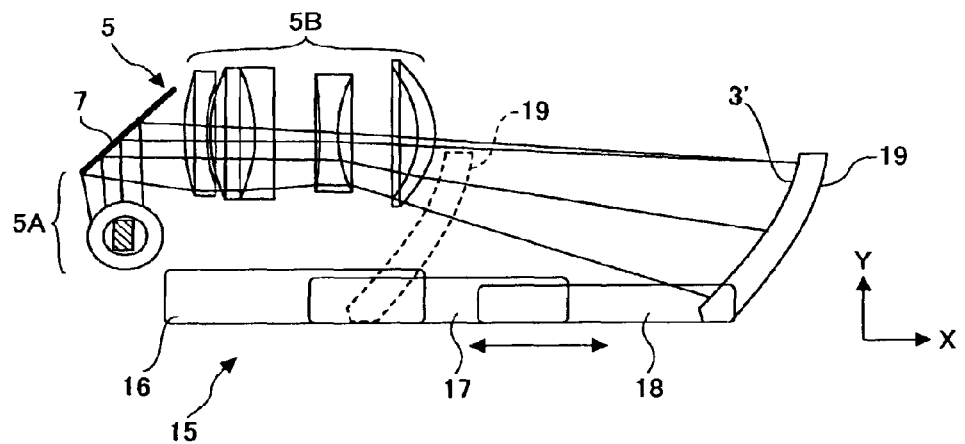
FIG. 11A shows a movable mechanism according to another embodiment of the invention when an image is being projected.
Figure 11B:
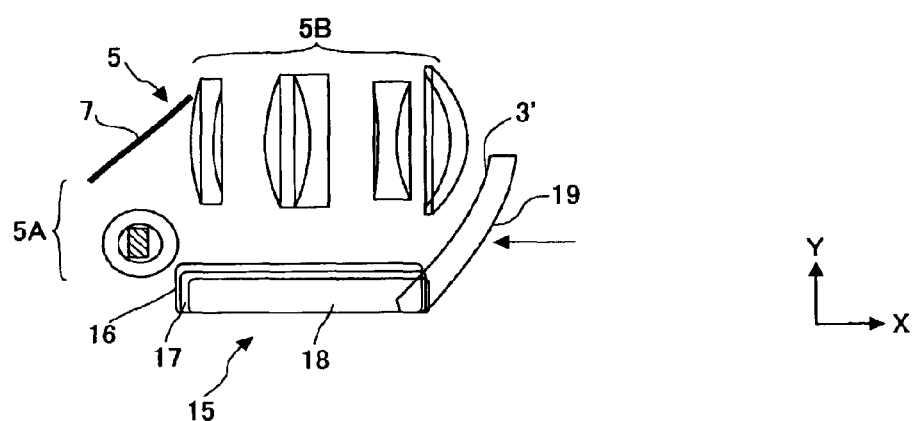
FIG. 11B shows the movable mechanism when no image is being projected.

FIGS. 11A and 11B show a fifth embodiment of the invention.

As shown in FIGS. 11A and 11B, which are X-Y plane views, there is some space under the second group 5B of the first optical system 5 facing the base surface. In this space, there is provided a movable mechanism 15 for moving the second optical system 3' in a direction such that the distance between the second optical system 3' and the first optical system 5 can be reduced.

Specifically, the movable mechanism 15 includes a fixed frame 16 fixed to the base surface in the space under the second group 5B of the first optical system 5. Movable frames 17 and 18 are housed within the fixed frame 16 in such a manner as to be movable toward the second optical system 3'. A support member 19 for supporting the second optical system 3' is fixed to the end of the movable frames 18.

When the apparatus is not used, i.e., when no image is being projected, the second optical system 3' can be positioned closer to the first optical system 5, as shown in FIG. 11B, whereby the space occupied by the entire apparatus can be reduced.

Figure 12A:
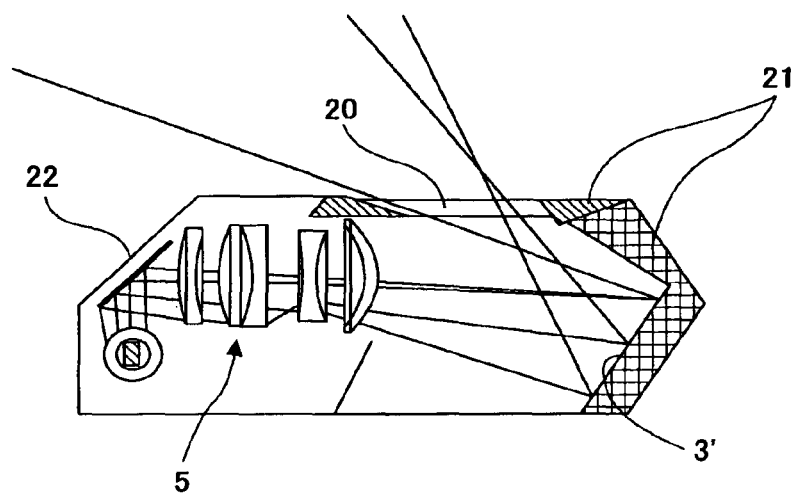
FIG. 12A shows a side view showing an opening structure, a light-blocking structure, and a movable mechanism according to another embodiment of the invention.
Figure 12B:
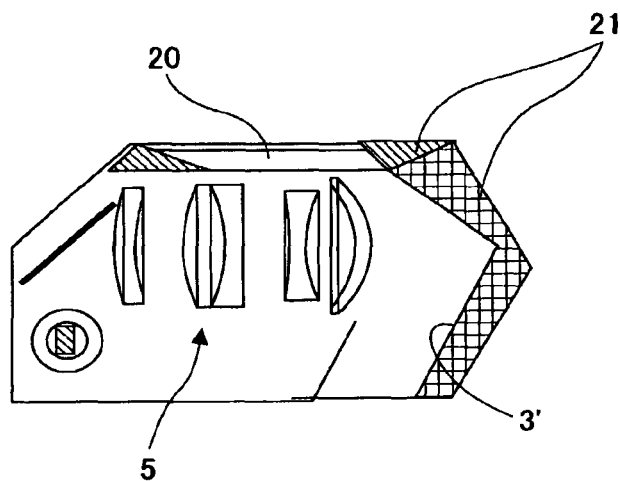
FIG. 12B shows another side view of the embodiment of FIG. 12A where the movable mechanism is moved to reduce the size of the apparatus.

FIGS. 12A and 12B show a sixth embodiment of the invention.

As shown in FIGS. 12 and 12B, which are X-Y plane views, an opening portion 20 and a light-blocking portion 21 are provided in an optical path space between the second optical system 3' and the projection surface 4 such that the light flux passes through the opening portion 20 after being reflected by the second optical system 3' and before arriving at the projection surface 4.

The opening portion 20, which may be a simple hole, is preferably provided by a light transmissive material. By providing the opening portion 20, flare light that may reach the projection screen can be blocked, whereby improved image quality in terms of, e.g., contrast can be achieved. Further, it prevents the collection of dust or foreign matter on the reflecting surface of the second optical system 3'. If dust or foreign matter attaches to the reflecting surface of the second optical system 3', the quality of the projected image degrades.

Should dust or foreign manner burn to the reflecting surface due to the heat of projection light, a permanent projection image quality degradation may result. Such possible problems can be prevented by the opening portion 20.

As shown in FIG. 12B, the opening portion 20 and the light-blocking portions 21 are adapted to move along with the second optical system 3' so that they can be stored within the apparatus. In this way, the size of the apparatus can be further reduced. A movable unit similar to the movable unit described with reference to FIG. 11 may be used for this purpose.

The invention claimed is:

1. A projection optical system comprising:
   a first optical system including a transmissive-refractive element; and
   a second optical system including a reflective-refractive element,
   wherein an image formed by a spatial light modulator is projected by the projection optical system on a projection surface,
   wherein a light beam that travels along an optical path that leads from the second optical system to the projection surface in an optical path between a center of the image formed by the spatial light modulator and the projection surface is projected at an angle with respect to a normal to the projection surface, and
   wherein an optical axis of the first optical system is folded to a folded position by an optical path deflecting unit in an area of the first optical system where the light beam entering the optical path deflecting unit is a converging light beam or a substantially parallel light beam.

2. The projection optical system according to claim 1, wherein, when a vector in a direction of travel of the light beam is vector A, a projected component of the vector A that is substantially parallel to the projection surface is defined as an up direction, and a direction opposite to the up direction is defined as a down direction, and
   the first optical system is folded to the folded position by the optical path deflecting unit in a direction including a vector in the up or down direction.

3. The projection optical system according to claim 2, wherein, when a direction perpendicular to the up or down direction is defined as a horizontal direction, the optical axis of the first optical system is folded in a direction including a vector in the horizontal direction in addition to the direction including the vector in the up or down direction.

4. The projection optical system according to claim 1, wherein light fluxes emitted by a group of lenses do not spread or are substantially parallel, and
   a first optical path length from the spatial light modulator to the folded position is shorter than a second optical path length from the folded position to the second optical system.

5. The projection optical system according to claim 1, wherein the folded position in the first optical system is such that light fluxes emitted by a group of lenses disposed closer to the spatial light modulator with reference to the folded position do not spread or are substantially parallel.

6. The projection optical system according to claim 1,
   wherein the reflective-refractive element of the second optical system has a positive power, and
   wherein an intermediate image is produced between the first optical system and the second optical system.

7. The projection optical system according to claim 6, wherein the reflective-refractive element having the positive power has the largest effective diameter in the projection optical system.

8. The projection optical system according to claim 7, wherein, when a vector in a direction of travel of the light beam is vector A, a projected component of the vector A that is substantially parallel to the projection surface is defined as an up direction, and a direction opposite to the up direction is defined as a down direction,
   the first optical system is folded to the folded position by the optical path deflecting unit in a direction including a vector in the up or down direction toward a lower edge of the reflective-refractive element, and
   wherein a group of lenses disposed closer to the spatial light modulator with reference to the folded position in the first optical system is disposed in a space whose lower limit is defined by the lower edge of the reflective-refractive element.

9. The projection optical system according to claim 1, wherein a group of lenses disposed closest to the spatial light modulator in the first optical system has an optical axis L1, the optical axis L1 is folded by a first optical path deflecting unit disposed on the optical axis L1 into an optical axis L2, and the optical axis L2 is folded by a second optical path deflecting unit disposed on the optical axis L2 into an optical axis L3, and
   wherein the optical axes L1, L2, and L3 are not in the same plane in the first optical system.

10. The projection optical system according to claim 1, wherein the first optical system includes a focus adjusting mechanism provided for a group of lenses in the first optical system that are disposed closest to the second optical system.

11. The projection optical system according to claim 1, wherein the optical path deflecting unit includes a planar mirror.

12. The projection optical system according to claim 1, further comprising:
a plurality of optical path deflecting units,
wherein two of the plurality of optical path deflecting units that are disposed on a single optical axis are integrally or successively structured.

13. The projection optical system according to claim 11, wherein the optical path deflecting unit comprises a prism including two optical path deflecting units, wherein a normal to a deflecting/reflecting surface of one of the optical path deflecting units and a normal to a deflecting/reflecting surface of the other of the optical path deflecting units are perpendicular to each other.

14. The projection optical system according to claim 1, wherein a control substrate for the spatial light modulator is disposed substantially parallel to a left or right direction of the projection surface and to a plane that includes the optical axis of a group of lenses in the first optical system that are disposed closest to the second optical system.

15. The projection optical system according to claim 9, wherein an illumination optical system is disposed in a spatial region surrounded by the optical axes L1, L2, and L3.

16. The projection optical system according to claim 1, wherein the spatial light modulator is disposed at a height that is the same as or above a height of a lowest edge of the second optical system.

17. The projection optical system according to claim 1, further comprising:
a movable mechanism that supports the second optical system movably relative to the first optical system,
wherein the second optical system is movable toward the first optical system when no image is being projected in order to reduce a depth of the projection optical system.

18. The projection optical system according to claim 1, wherein an opening portion and a light-blocking portion are provided in an optical path between the second optical system to the projection surface, and
wherein, during projection of an image, reflected light from the second optical system passes through the opening portion in a converging manner.

19. The projection optical system according to claim 1, wherein at least one transmissive-refractive element is disposed in the optical path between the optical path deflecting unit and a location of an intermediate image plane, and the intermediate image plane is disposed closer to the second optical system than is the optical path deflecting unit.

20. The projection optical system according to claim 1, wherein the reflective-refractive element is concave.

21. A projection optical system comprising:
a first optical system including a transmissive-refractive element; and
a second optical system including a reflective-refractive element,
wherein an image formed by a spatial light modulator is projected by the projection optical system on a projection surface,
wherein a light beam that travels along an optical path that leads from the second optical system to the projection surface in an optical path between a center of the image formed by the spatial light modulator and the projection surface is projected at an angle with respect to a normal to the projection surface,
an intermediate image of an image formed at the spatial light modulator is formed between the first optical system and the second optical system, and
wherein an optical axis of the first optical system is folded by an optical path deflecting unit in a direction including a vector in an up or down direction between a first lens in the first optical system and a second lens in the first optical system.

22. The projection optical system according to claim 21, wherein the light beam that is radiated from a group of lenses between the spatial light modulator in the first optical system and the optical path deflecting unit, and the light beam that enters the optical path deflecting unit, are a converging light beam or a substantially parallel light beam.

23. The projection optical system according to claim 22, wherein a first optical path length from the spatial light modulator to the optical path deflecting unit is shorter than a second optical path length from the optical path deflecting unit to the second optical system.

* * * * *